Dec. 23, 1941.  W. B. TURNER  2,267,002
CORNER BEAD
Original Filed Nov. 15, 1939
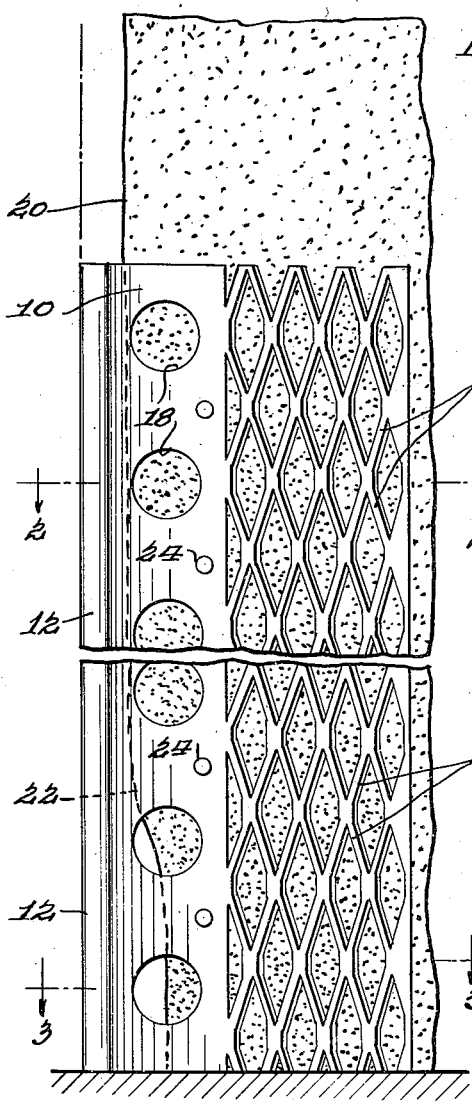
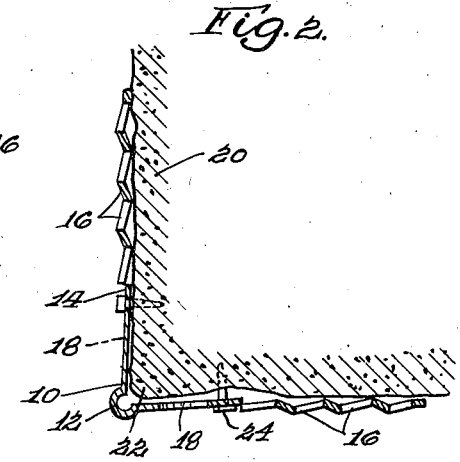
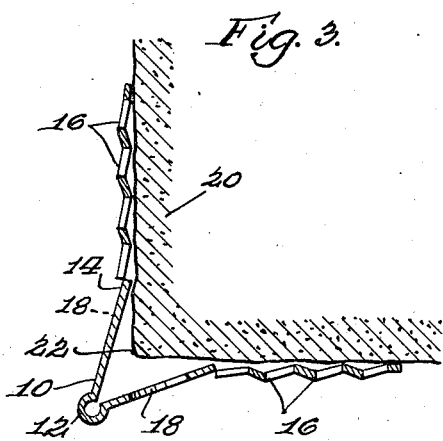
Inventor
William B. Turner Patented Dec. 23, 1941

2,267,002

UNITED STATES PATENT OFFICE 2,267,002

CORNER BEAD

William B. Turner, Milwaukee, Wis., assignor to Milcor Steel Company, Milwaukee, Wis., a corporation of Delaware Continuation of application Serial No. 304,477, November 15, 1939. This application May 23, 1941, Serial No. 394,940

7 Claims. (Cl. 72—121)

This invention pertains to a sheet metal product, and more particularly to angular metallic corner beads having solid wing portions of appreciable width and expanded wing members.

This application is a continuation of application Serial No. 304,477, filed November 15, 1939.

In corner beads now in use it is not unusual to provide beads of the so-called "solid wing type" and the "expanded wing type." Most of the present "solid wing" type of bead have a flange or wing of sufficient width to reach the masonry wall though it may be appreciably out of plumb, but this type is an outgrowth of a bead having relatively narrow flanges so that it was necessary to use clips to bridge the distance between the bead and the masonry wall where that wall was out of plumb, and this served to carry the fastening back from the bead. This of course is not as desirable or advantageous as the herein described bead, as will be hereinafter more particularly described. Each has a different advantage. The solid wing corner bead is provided with various widths of substantially solid flanges or wings for the purpose of permitting the lining up and plumbing of masonry corners to which the plaster is to be applied, the edges of which corners may be out of line an appreciable amount, that is, an inch or more. These wings are designed to project back from the outside corner a sufficient distance to strengthen the corner without throwing all the strains to which they may be subjected to the immediate corner structure. However, the difficulty with this type of bead is a tendency to cause cracks in the plaster at the outside edge of the solid wing due to the abrupt termination of the heavy piece of rearwardly projecting metal with nothing to distribute or diffuse the stresses transmitted thereby.

In the expanded wing type of bead, sufficient width of wing is provided to permit the wing to reach the masonry back from the corners, but at the same time the strains are diffused through the expanded wings of the bead without the danger of cracking the plaster at the edges of the bead. In this type of bead the workman applying the bead has difficulty as the bead is not rigid, and does not readily retain itself in alignment once it is put in place and until the plaster is applied. This type of bead cannot readily be nailed to the adjacent masonry with the usual head nails, so that either special nails must be used, or it must be spotted as by gypsum or some other means. Spotting is the usual method, but this is not sufficiently secure, and the bead can easily be dislocated or can become unfastened during the construction work, with a consequent delay.

It is therefore an object of this invention to provide a corner bead which is sufficiently rigid to permit its easy erection and application, but at the same time is so constructed that the danger of cracks forming in the wall at the edges of the wings of the bead is eliminated.

Another object of the invention is to provide a corner bead which can be readily secured by the usual masonry nails (or by plaster keys if desired), and one which may be used to permit the ready lining up and plumbing of masonry corners.

A further object is to provide a corner bead which is inexpensive to construct, is readily applied and secured to a masonry corner conforming to the shape of the masonry, and one which fulfills all requirements of manufacture and service.

Still a further object of the invention is to provide a corner bead construction which may be readily nailed in fixed position in applying it to a corner of adjacent masonry, and one which has all the advantages of a solid or expanded wing type but with none of the disadvantages thereof.

A further object of the invention is to provide a corner bead so constructed that when applied to adjacent masonry the plaster applied thereon extends from one wing to another to interlock with the bead.

A yet further object of the invention is to provide a bead having wings wherein apertures are provided in adjacent wings, said apertures being so located as in staggered relation that the applied plaster extends through the apertures of one wing to the solid portions of the adjacent wing, thereby forming secure interlocking means and, because said apertures are not horizontally aligned as in usual practice, substantially double the number of plaster keys is provided.

A further object is to provide a corner bead having all of the above named objects and advantages, and is additionally so constructed and arranged that when applied to a masonry corner it may be readily secured as by nailing the solid portion of the bead to the masonry with usual nails, permitting the expanded portion of the wing to lie along the corner, the said portion being of sufficient width to reach the masonry corner even though appreciably out of alignment whereby a solid contact is made from the nose of the bead to the masonry for rigidity and substantial fastening (attachment) is provided, and the expanded portion of the wing extending into the plaster from the fastened solid portion of the wing diffuses stresses to prevent cracking of the plaster.

A further object of the invention is to provide a bead having the advantages and rigidity of a solid metal angle applied in direct contact with the rough structural corner, with the advantages of integral expanded portions so that a construction is provided where there is no stress concentration at the edges of the solid flanges, the stresses being diffused to a point where no cracks will occur in the applied plaster.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary side elevation of a masonry corner showing the corner bead applied thereto;

Figure 2 is a fragmentary sectional top plan view taken substantially in the plane as indicated by the line 2—2 of Figure 1;

Figure 3 is a fragmentary sectional top plan view taken substantially in the plane as indicated by the line 3—3 of Figure 1.

In the corner bead construction illustrated, the bead 10 consists essentially of the nose portion 12 provided with diverging solid flanges 14, said flanges each being provided with expanded wing portions 16, said expanded wing portions being of substantially diamond mesh, such as shown in Curtis Patent No. 1,419,232, issued June 13, 1922, and Jones Patent No. 1,988,739, issued January 22, 1935. By a reference to Figures 2 and 3, it will be seen that in effect the junctions of the diamond forming metal are along vertical corrugations. The flanges 10 are shown as provided with the spaced apertures 18 preferably of a suitable size to lighten the flanges 14, but at the same time of sufficient size to provide suitable fastening means for plaster keys, although in certain cases it may be desirable to omit said apertures. Said apertures in adjacent (opposite) flanges preferably are staggered so that when the plaster is applied it will extend through the apertures in one flange across the masonry corner, and will abut the solid metal of the inside of the adjacent flange forming a lock (interlocking means) with the edge of the masonry. The flanges are of a width preferably sufficient to develop all of the rigidity necessary to permit the bead to be readily applied to the adjacent masonry corner, and at the same time of sufficient width to overlap the edge of said corner. The nails 24 can be applied through the flanges as shown in Figure 1 for holding the beads solidly in place, and apertures may be formed in the flanges prior to application of the nails, or the nails simply may be driven through said flanges.

In the figures the masonry corner is illustrated at 20. The edge 22 of said corner is shown as uneven and out of plumb. It will be seen, however, referring to the figures, that the flange 14 completely overlaps said edge, i. e., the flanges of the bead are at least as wide as a masonry or other structural base is out of plumb. The expanded wing 16 then contacts the masonry wall, and the entire bead readily conforms to the shape of the masonry and forms a means permitting the application of plaster to provide a smooth corner construction. Due to the width of the flanges the bead may be readily applied and is of sufficient stiffness to permit it to be easily handled, yet the expanded wing construction not only forms an adequate anchorage for the plaster applied over the base and bead construction, but is of such width as to prevent cracks from forming should any shock be applied to the bead, as said shock will be diffused.

In the construction illustrated, the flanges 14 are of sufficient width to overlap the edge 22 which may be out of plumb in normal constructions, and in general it may be said that the solid flanges are wide enough so that the standard bead nails 24 can be driven through said flanges readily, and into the adjacent masonry to hold the beads in place for ready application of the plaster. The nails in opposite flanges are preferably staggered, and it has been found that the expanded wing may be conveniently made approximately one and one-half times the width of the flange. For example, the flange may be made one inch, and the expanded wing may be made one and one-half inches, which dimensions will apply to beads for a majority of cases. Expressing it differently, the wings are of such width as readily to diffuse the stresses which would ordinarily be transmitted to the masonry base at the edges of the flanges. Thus cracking of the walls is prevented. The flanges then may be said to be substantially two-thirds of the width of the wings.

It is to be understood that I do not wish to be limited by the exact embodiment of the device shown, which is merely by way of illustration and not limitation as various and other forms of the device will of course be apparent to those skilled in the art without departing from the spirit of the invention or the scope of the claims.

I claim:

1. In a corner bead construction, the combination of a bead having a nose, a pair of flanges extending from said nose, said flanges having spaced apertures therein having a diameter of substantially half the width of said flanges, the apertures in adjacent wings being staggered, and expanded wings integrally attached to said flanges, the ratio of the width of said flanges to the width of said wings being substantially one (1) to one and one-half (1½), said flanges being of sufficient width to accommodate fastening means between the corner bead and the adjacent masonry.

2. In corner bead construction, the combination of a bead having a nose, a pair of flanges extending from said nose, said flanges having spaced apertures therein, the apertures in adjacent wings being staggered, and expanded wings integrally attached to said flanges, the width of said wings being but slightly greater than the width of said flanges, said flanges being of sufficient width to accommodate fastening means between the corner bead and the adjacent masonry.

3. In corner bead construction, the combination of a bead having a nose, a pair of flanges extending from said nose, said flanges having spaced apertures therein, and expanded wings integrally attached to said flanges, the width of said wings being not over one and one-half (1½) times greater than the width of said flanges, said flanges being of sufficient width to accommodate fastening means between the corner bead and the adjacent masonry.

4. In corner bead construction, the combination of a bead having a nose, a pair of flanges extending from said nose, and expanded wings integrally attached to said flanges, the ratio of the width of said flanges to the width of said wings being substantially one (1) to one and one-half (1½), said flanges being of sufficient width to accommodate fastening means between the corner bead and the adjacent masonry.

5. In corner bead construction, the combination of a bead having a nose, a pair of flanges extending from said nose, and expanded wings integrally attached to said flanges, the width of said wings being but slightly greater than the width of said flanges, said flanges being of sufficient width to accommodate fastening means adapted to be used to fasten said corner bead to the adjacent masonry.

6. In a corner bead construction for a structural base, the combination of a bead having a nose, a pair of flanges extending from said nose, the width of said flanges being substantially equal to the amount that the structural base can be out of plumb and of a width to permit fastening means to be used to fasten said flanges to said structural base, and expanded wings provided on said flanges and adapted to engage said structural base, the width of said wings being sufficient to diffuse stresses transmitted through said flanges.

7. In a corner bead construction for application to a structural base, the combination of a bead having a nose, a pair of flanges extending from said nose, and expanded wings provided on said flanges and adapted to engage said structural base, the width of said wings being sufficient to diffuse stresses transmitted through said flanges, the width of said flanges being substantially two-thirds (⅔) of the width of said wings and of a width to permit fastening means to be used to fasten said flanges to said structural base.

WILLIAM B. TURNER.